United States Patent [19]

Pritchett

[11] 4,298,086
[45] Nov. 3, 1981

[54] COUPLING MEANS FOR HORIZONTAL VIBRATOR

[75] Inventor: William C. Pritchett, Plano, Tex.

[73] Assignee: Atlantic Richfield Company, Los Angeles, Calif.

[21] Appl. No.: 83,070

[22] Filed: Oct. 9, 1979

[51] Int. Cl.³ ............................................. G01V 1/047
[52] U.S. Cl. .................................... 181/113; 181/114; 181/119; 181/401
[58] Field of Search .................. 367/75; 181/117, 116, 181/119, 121, 401, 113; 248/545, 677, 678; 172/40

[56] References Cited

U.S. PATENT DOCUMENTS

| | | | |
|---|---|---|---|
| 2,557,960 | 6/1951 | Gerhardt | 89/37 L |
| 3,046,843 | 7/1962 | Rowe | 248/678 |
| 3,159,232 | 12/1964 | Fair | 181/401 |
| 3,159,233 | 12/1964 | Clynch et al. | 181/119 |
| 4,135,599 | 1/1979 | Fair | 181/121 |
| 4,143,736 | 3/1979 | Fair | 367/75 |

Primary Examiner—Howard A. Birmiel
Attorney, Agent, or Firm—Robert M. Betz

[57] ABSTRACT

The present invention relates to means for coupling the horizontally-directed force of a seismic transducer into the earth as a downward going shear wave. The coupling means consists of a plurality of downwardly convergent wedge-shaped earth-engaging cleats mounted on the transducer support means. The cleats differ from each other as to depth and sharpness, the sharper cleats being the deeper ones, so that they contact the earth's surface prior to the blunter ones and penetrate hard surfaces more readily. The blunter cleats, on the other hand, slow the rate of penetration in softer materials and thus prevent bottoming out. The cleats are configured so that the total edge length of the sharper cleats is less than that of the blunter ones, further insuring a high vertical loading on initial contact with hard surfaces. This construction permits efficient coupling into the earth of the horizontal force of a vibrator in soils and other earth materials varying widely in competency while minimizing bottoming out.

14 Claims, 7 Drawing Figures

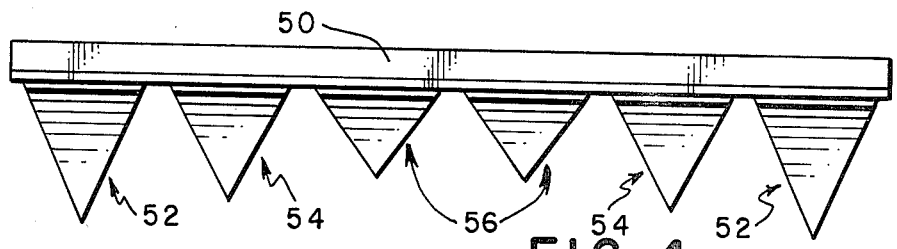
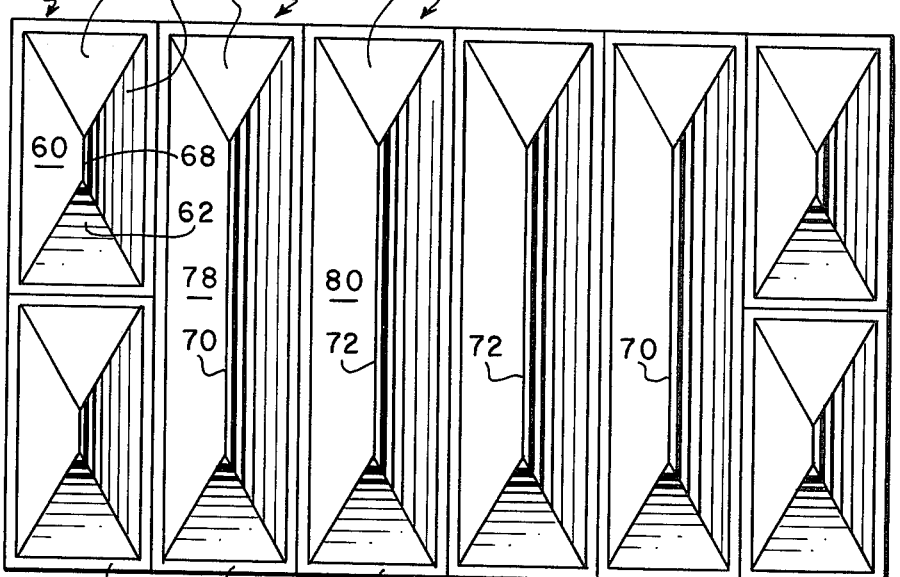
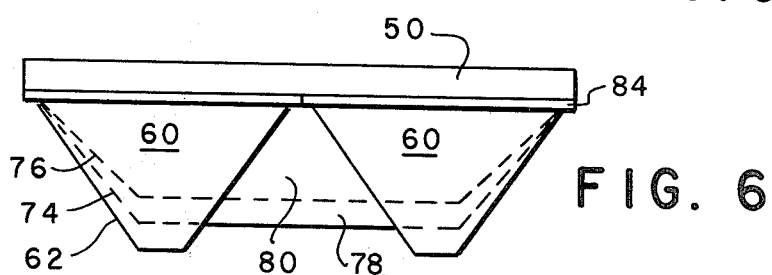
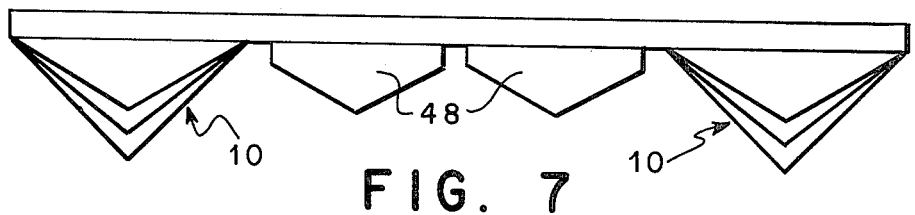

COUPLING MEANS FOR HORIZONTAL VIBRATOR

BACKGROUND OF THE INVENTION

This invention relates generally to transducers for inducing vibratory signals in an elastic medium such as the earth and, more particularly, an improved means for coupling the horizontally-directed force of a seismic transducer into the earth.

The closest prior art known to applicant is exemplified by U.S. Pat. No. 4,135,599, wherein the horizontal force of a vibrator is coupled into the earth by means of a pair of identical generally pyramidal cleats mounted on the underside of the vibrator support means. The main lateral load-bearing plates are trapezoidal, while the end plates are triangular. The lateral and end plates of these cleats all converge to form cleat edges aligned transversely to the direction of the applied horizontal vibrator force and along the direction of travel of the transporting vehicle.

This prior art patent suggests that the character of the earth surface to be engaged should govern the choice of overall shape, cleat edge length, and total area of the lateral load-bearing surfaces of the cleats. But since all the cleats are identical and interchangeable, the configuration which works well with one type of earth material may be inefficient with others.

For example, cleats constructed according to this prior art design may be sharp enough to perform well on surfaces ranging from bedded limestone to firm clay soils. However, on sandy soil, i.e. loose soil, the same cleats may work down rapidly during each horizontal sweep of the vibrator so that much or all of the weight of the vibrator is transferred to the vibrator support means itself at which point little horizontal earth motion can be generated by the vibrator.

The use of a blunter prior art cleat construction in the illustrative situation above would reduce this rate of penetration in sandy soils and hence, the likelihood of "bottoming out". But this, in turn, would reduce the rate of penetration and efficiency in rock (i.e. harder materials), where more slippage would result and more unwanted vertical force would be generated, and thus create undesirable compressional waves and undesirable higher harmonics in the shear waves.

Another problem inherent in prior art cleat designs of the type described is that the front and back or end cleat surfaces (i.e., those parallel to the direction of vibrator motion) are essentially inactive, in that they do not aid in providing the desired horizontal shear wave coupling to the earth. However, because they slope away from the vertical when the cleats are imbedded, these sloping surfaces take up part of the total vertical force available to hold the cleats firmly against the earth. As a result, less force is available to compress unconsolidated earth materials adjacent to the surfaces of the active plates. Compression of the earth adjacent to the active surfaces is desirable because compression increases the shear strength of unconsolidated earth materials. Any decrease in the compression adjacent active surfaces decreases the shear strength of the earth in this vicinity, so the horizontal stress which can be transmitted downward through the earth is correspondingly reduced.

It is, therefore, a general objective of this invention to provide an improved means of coupling the horizontally directed force of a transducer into an elastic medium such as the earth.

It is another object of this invention to provide means for coupling the horizontally-directed force of a transducer into the earth which are adapted for use in soils varying widely in competency.

It is yet another object of this invention to provide means for coupling of the horizontal shear wave energy of a transducer into the earth which is adapted to prevent premature "bottoming out" of the transducer.

It is a still further object of this invention to provide means for coupling the horizontal shear wave energy of a vibrator into the earth adpated to generate less unwanted compressional wave energy and less unwanted higher harmonics in the shear wave.

Other and further objects and advantages of the invention will become apparent upon consideration of the following detailed description and drawings.

In summary, in accordance with a preferred embodiment of the present invention, means are provided for coupling the energy of a horizontal vibrator into the earth comprising a plurality of downwardly convergent earth-engaging cleats dependently supported from said transducer. The cleats are in the form of inverted wedges each of whose rectangular, lateral load-bearing plates are convergently joined along a common edge to form a cleat edge aligned transversely to the direction of the applied horizontal force, and whose triangular opposed end plates are normal to the horizontal plane of such edges. The cleats may differ in construction as to their depth, sharpness, and edge length. Preferably, the sharper cleats are the deeper ones, so that they are adapted to penetrate hard surfaces more readily. Also, the lateral extent of the various cleats is preferably such that the total effective edge length of the sharper cleats is less than that of the blunter ones, thereby insuring a higher vertical loading on the sharper cleats.

In an alternate embodiment of this invention, the lateral or earth-coupling plates of the cleats are trapezoidal and the triangular end plates are sloped from the normal so as to provide a further means for varying the total effective edge length of the cleats.

BRIEF DESCRIPTION OF THE DRAWINGS

FIG. 4 represents, in semi-diagrammatic form, an end elevational view of a transducer earth-coupling means in accordance with an alternate embodiment of this invention.

FIG. 5 represents, in semi-diagrammatic form, a bottom plan view of the transducer earth-coupling means of FIG. 4.

FIG. 6 represents, in semi-diagrammatic form, a side elevational view of the transducer earth-coupling means of FIG. 4.

FIG. 7 represents, in semi-diagrammatic form, transducer earth-coupling means in accordance with a further alternate embodiment of this invention.

DETAILED DESCRIPTION OF THE PREFERRED EMBODIMENTS

Figure 1:
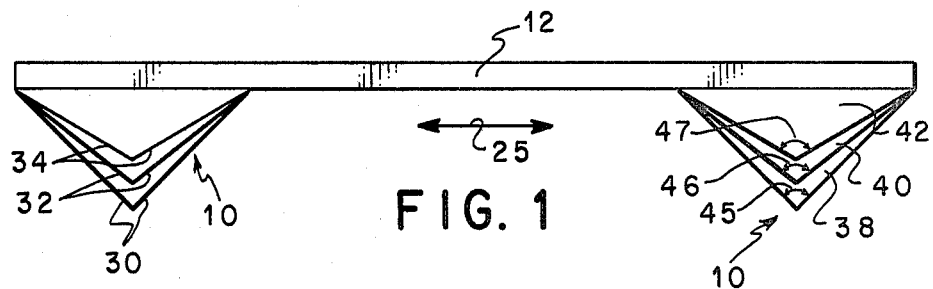
FIG. 1 represents, in semi-diagrammatic form, an end elevational view of a transducer earth coupling means in accordance with a preferred embodiment of this invention.
Figure 2:
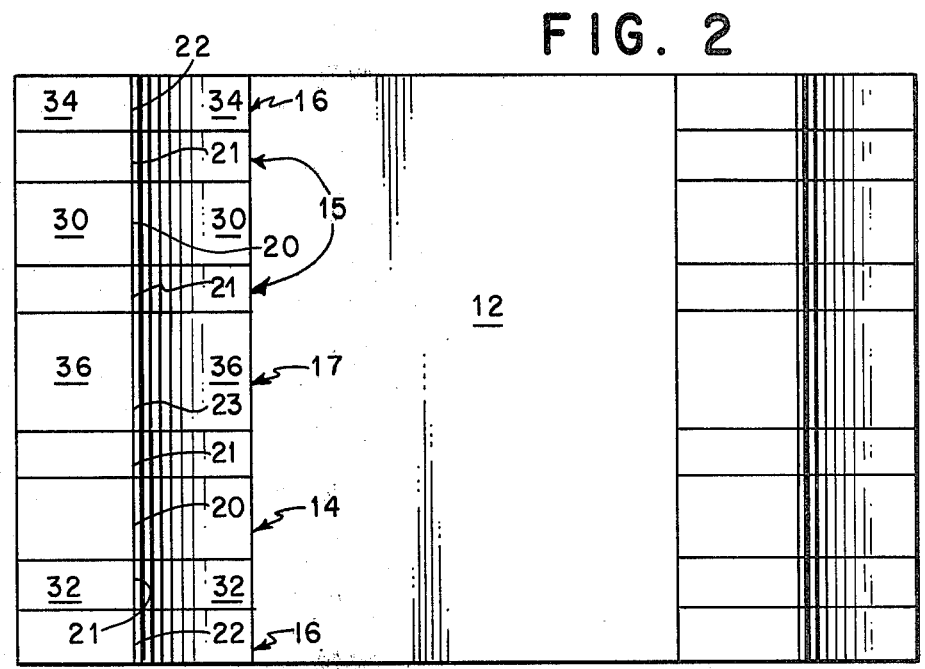
FIG. 2 represents, in semi-diagrammatic form, a bottom plan view of the transducer earth-coupling means of FIG. 1.
Figure 3:
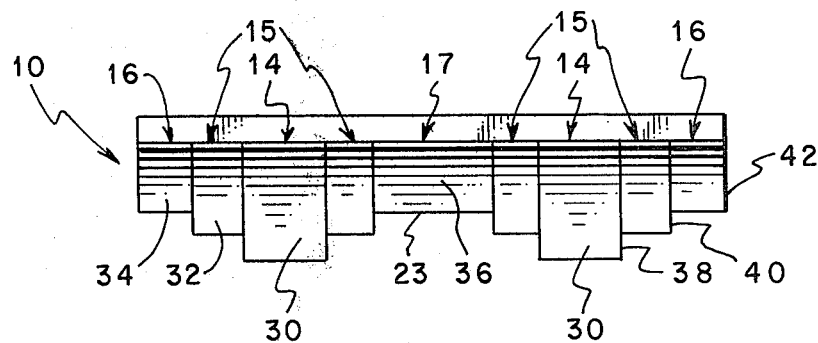
FIG. 3 represents, in semi-diagrammatic form, a side elevational view of the transducer earth-coupling means of FIG. 1.

Referring now to the drawings and in particular to FIGS. 1, 2 and 3, coupling means for a horizontal shear wave transducer are depicted generally in accordance with the preferred embodiment of this invention. A pair of rows of cleats either of which is generally indicated by the reference numeral 10 are dependently supported in any convenient manner from support means such as base plate 12 for a horizontal vibrator (not shown). Each row of cleats 10 consists of a plurality of individual inverted wedge-shaped cleats of differing depth and sharpness. In what follows the same reference numeral is assigned to all cleats of identical configuration and to the identical components or features thereof, regardless of the location of such cleats along either of rows 10. Individual cleats may be given structural rigidity by means of spaced apart internal reinforcing plates (not shown) as is well known in this art. Although the number of the variations in depth, edge length and sharpness in such cleats is not critical to this invention, for illustrative purposes, four different configurations have been shown in FIG. 1.

Thus, it will be seen most readily in FIG. 3 that each row 10 includes a pair of spaced-apart cleats 14 of greatest depth, four cleats 15 of intermediate depth disposed on both sides of cleats 14, two cleats 16 of least depth at opposite ends of row 10 and a single cleat 17, also of least depth, in the center of row 10. Each of cleats 14 includes two vertical and parallel end plates and two converging, rectangular lateral plates all of which join to form a bottom cleat edge. As best seen in FIG. 2, the edges of cleats 14–17 are indicated respectively by reference numerals 20, 21, 22 and 23. Edges 20–23 are in alignment and extend transversely to the direction of the horizontal force to be applied by the transducer, shown in FIG. 1 by the arrows designated with the reference numeral 25.

As best seen in FIGS. 1 and 2, edges 20 of cleats 14 are formed by pairs of convergent lateral plates 30. Simlarly, pairs of lateral plates 32 converge to form edges 21 of cleats 15. Plates 34 converge to form edges 22 of cleats 16 at the opposite ends of row 10. Finally, edge 23 of center cleat 17 is formed by convergent plates 36. Since the bases of all cleats 14–17 are the same length in the direction 25, the depth of these cleats beneath base plate 12 is determined by the slope of their respective convergent, lateral plates. The result of the construction described is that the deepest cleats 14 have the smallest internal cleat edge angle 45 (FIG. 1), and hence are the sharpest. Cleats 15 of intermediate depth have a larger edge angle 46 and shallowest cleats 16 and 17 have the same largest edge angle 47, and hence are the most blunt.

Cleats 14–17 are preferably contiguous and in a practical construction, portions of their respective parallel faces may be common or dovetailed together. For example, as shown in FIG. 3 portions of end plates 38 of cleats 14 are contiguous with end plates 40 of cleats 15. Similarly, portions of end plates 40 are contiguous with end plates 42 of cleats 16. Each row of cleats 10 may be formed as a single unit to guard against possible bending near the center of the side of base plate 12. It may also be advantageous to build each row 10 in two groups of cleats 14–16 and bolt or weld each group to center cleat 17. Alternatively, the row of cleats may be split in the middle such that half of cleat 17 constitutes part of each of the two halves.

In operation, the full weight of the transducer will first be exerted on the sharper cleats 14 unless and until sufficient penetration is achieved to bring the remaining cleats into operation. On hard surfaces, only plates 30 will be operative, but the sharpness and loading of cleats 14 must insure sufficient penetration to prevent slippage and may be adequate to break up certain rock formations. The cleats 14 must bite in sufficiently for good shear wave coupling, and must be sharp enough to accomodate the hardest earth material likely to be encountered. If it is desirable to increase the initial vertical loading on cleats 14, the total effective length of edges 20 may be reduced in relation to the edge length of blunter cleats 15–17.

In firm soils plates 32 of cleats 15 will come into play as penetration increases. The added effective total length of edges 21 and the blunter edge angle 46 will slow the rate of penetration so as to prevent bottoming out. On still softer soils, penetration during a long sweep will allow plates 34 and 36 of cleats 16 and 17 to be pressed against the earth. The added length of edges 22 and 23 and still blunter edge angle 47 will slow the rate of penetration still further and will provide a continued horizontal couple to the earth. Because of this blunter edge angle, there will be more vertical force developed by the horizontal motion of the reaction mass and some loss of efficiency because of increased vertical compressional force component resulting in unwanted downward directed compressional waves. But, a construction as decribed will delay catastrophic loss of horizontal coupling which might otherwise result from bottoming out.

It should be understood that since the inactive parallel end plates, such as indicated by reference numerals 38, 40 and 42 (FIG. 3), are normal to the horizontal planes of edges 20–23, such end plates will transmit no vertical load and will therefore not diminish the vertical force available for maintaining maximum compressive stress in the earth adjacent to the surfaces of the active plates indicated by reference numerals 30, 32, 34 and 36. Furthermore, this parallel end plates construction coupled with the fact that cleats 14–17 are contiguous, prevents undesirable wedging action against rocks and earth that might otherwise lodge between adjacent cleats and cause the baseplate to bend.

For still more versatility of use in extremely loose soils, additional inner cleats 48 may be added to the construction described above as best seen in FIG. 7.

An alternate embodiment of this invention depicted in FIGS. 4, 5, and 6 illustrates a transducer base plate 50 on which are dependently mounted cleats of three different configurations identified respectively by reference numerals 52, 54 and 56. Cleats 52, 54 and 56 are of an inverted pyramidal shape, each consisting of two convergent trapezoidal lateral plates and two sloping end plates. For example, any of cleats 52 include a pair of lateral plates 60 and a pair of end plates 62 all of which converge to form ridge 68. In like manner, intermediate cleats 54 converge to form edges 70 and inner cleats 56 converge to form edges 72.

FIG. 4 illustrates that cleats 52 have the sharpest edge angle, cleats 54 are more blunt and cleats 56 are the most blunt in shape. The vertical loading exerted by cleats 52, 54 and 56 as they come respectively into operation is again dependent in part on the relative length of their respective edges. In this embodiment, end plates 62, 74 and 76 of cleats 52, 54 and 56 slope increasingly from the vertical as best seen in FIG. 6.

As in the previously described embodiment, the outboard cleats 52 first absorb the entire weight of the transducer on lateral plates 60 and end plates 62. As cleats 54 and 56 engages the earth's surface in sequence, their respective lateral plates 78 and 80 and end plates 74 and 76 are engaged sequentially. The cleats 52, 54 and 56 are mounted respectively on flanged bases 84, 86 and 88 which not only provide convenient means for bolting to support 50, but also facilitate replacement, if necessary.

As an example of cleat construction in accordance with the preferred embodiment of this invention as shown in FIGS. 1, 2, and 3, cleats 14, 15 and 16–17 may be given, respectively, interior edge angles of 90°, 104.9° and 123.4°. The corresponding depths of cleats 14–17 may be 13", 10", and 7", respectively. The corresponding values for the length of edges 20–23 may be 7", 5½", 6¾" and 13½". This produces a total effective edge length for the sharpest cleats of 14", for the blunter cleats of 22" and for the most blunt cleats of 27". If earth materials varying widely in competence are anticipated, cleats 14, 15 and (16–17) may be given interior edge angles of 75.1°, 90° and 110°, respectively, to insure positive shear wave coupling on even very hard surfaces.

All of the angular and linear values given above as well as the number of variations in cleat sharpness and vertical loading may be modified within the scope of this invention. The lateral and end plates of the cleats are not confined to the specific quadrangular and triangular shapes illustrated, but may assume other generally pyramidal or wedge-shaped configurations.

I claim:

1. In a transducer for inducing shear waves in an elastic medium including a horizontally movable support means adapted to couple the energy of said transducer into said medium, the improvement comprising a plurality of cleat means on said support structure for engaging the surface of said medium, said cleat means being of differing depth.

2. Apparatus as in claim 1 wherein the deeper of said cleat means are adapted to apply a higher vertical loading to said surface than the shallower of said cleat means.

3. Apparatus as in claim 2 wherein said deeper cleat means are sharper than said shallower cleat means.

4. Apparatus as in claim 2 wherein the edges to which said deeper cleat means respectively taper have a collective length less than that of the corresponding edges of said shallower cleat means.

5. Apparatus as in claim 1 wherein each of said plurality of cleat means comprises:
   a. a pair of like quandrangular lateral plates downwardly convergent from said support means to form a cleat edge adapted to extend horizontally and transversely to the direction of horizontal transducer motion, and
   b. a pair of triangular opposed end plates respectively interconnected between the adjacent convergent edges of said coupling plates.

6. Apparatus as in claim 5 wherein said cleat means are of at least two different depths and wherein the interior angle between the lateral plates of said deeper cleats is smaller than the interior angle between the lateral plates of said shallower cleats.

7. Apparatus as in claim 5 wherein each pair of said opposed end plates of said cleat means are parallel and adapted to extend perpendicular to horizontal planes extending through said respective cleat edges.

8. Apparatus as in claim 5 wherein the total length of the cleat edges of said deeper cleats is less than the total length of the cleat edges of said shallower cleats.

9. Apparatus as in claim 6 wherein said plurality of cleat means are of three different depths and degrees of sharpness.

10. In a transducer for inducing waves in an elastic medium including a planar support adapted to couple the horizontally-directed energy thereof into said medium, the improvement comprising a plurality of wedge-shaped cleats depending from said support means, each of said cleats having two parallel end plates adapted to extend perpendicular to the plane of said support and two convergent lateral plates joined to form an earth-engaging cleat edge, said cleats being divided into at least two spaced-apart rows within each of which all of said cleat edges are in axially alignment extending normal to the direction of the energy applied by said transducer and wherein the cleats in each said row vary in configuration from greater to lesser depth and sharpness.

11. Apparatus as in claim 10 wherein the end plates of adjacent cleats in each said row are contiguous.

12. Apparatus as in claim 10 wherein each of said rows of cleats is formed as a unitary rigid structure.

13. Apparatus as in claim 10 wherein the cleats in each said row are of maximum depth and sharpness in at least two spaced apart positions intermediate the extremities of said row.

14. Apparatus as in claim 13 wherein the depth and sharpness of the cleats in each of said rows reaches a minimum midway between the extremities of said row.

* * * * *